March 12, 1940.                H. J. DIETZ                2,193,021
MOUNTING FOR X-RAY INTENSIFYING SCREENS
Filed Feb. 16, 1939
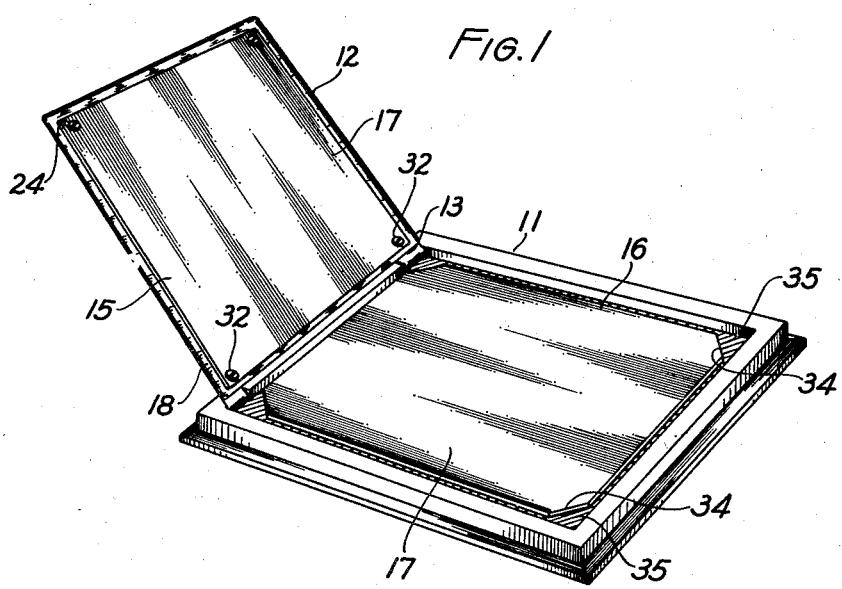
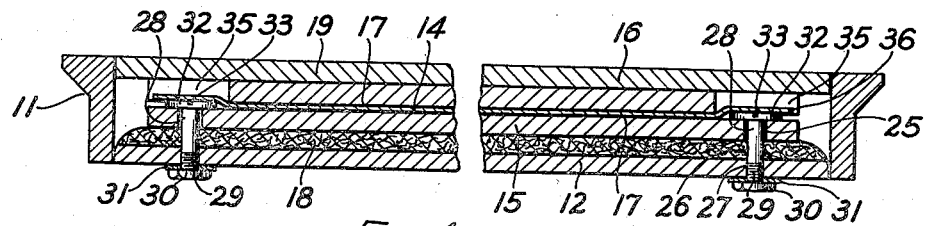
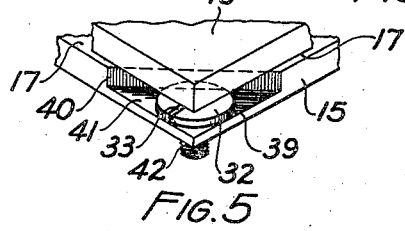
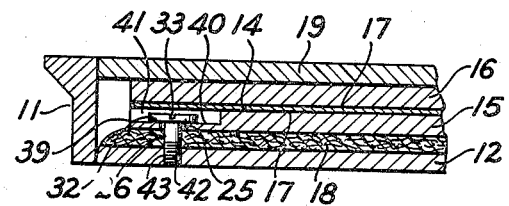
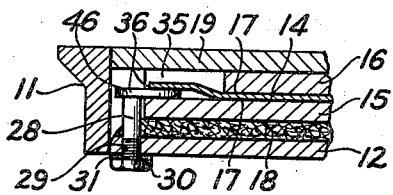
HERBERT J. DIETZ
INVENTOR
BY
ATTORNEYS Patented Mar. 12, 1940

2,193,021

UNITED STATES PATENT OFFICE 2,193,021

MOUNTING FOR X-RAY INTENSIFYING SCREENS

Herbert J. Dietz, Rochester, N. Y., assignor to Eastman Kodak Company, Rochester, N. Y., a corporation of New Jersey Application February 16, 1939, Serial No. 256,771

6 Claims. (Cl. 250—68)

The present invention relates to X-ray cassettes, and more particularly to a new and novel arrangement for mounting an intensifying screen therein.

Such cassettes are usually made of a substantially rigid material, such as metal, and formed with a radiolucent front window through which the X-ray may pass to expose the sensitized film positioned within the cassette. In order to reduce the time required for exposing the sensitized film, such cassettes are usually provided with intensifying screens positioned on opposite sides of the film. These screens, as is well known, have the surfaces in contact with the film coated with a suitable material which fluoresces when exposed to X-rays so as to reduce the time of exposure. In order to be most effective, it is highly essential that intimate contact be maintained between the fluorescent surfaces of the screens and the emulsion coatings of the film over the entire area of the latter.

Such intensifying screens are usually secured in position in the cassettes by means of a liquid adhesive, such as rubber cement, shellac, or by double-faced adhesive tape, none of which are entirely satisfactory. When rubber cement is used, a compound is formed which liberates peroxide, which in turn fogs the film. In addition, small humps may be formed at the points of application of the cement, which humps tend to hold portions of the screen out of intimate contact with the film, the disadvantages of which are well known to those in the art. It has also been found that when shellac is used to secure the screen, the shellac will dry out and shrink, and cause small depression areas in the screen at the points of the application of the shellac, thus preventing the required screen to film contact. Adhesive tape, due to the presence of cement in the adhesive, also fogs the film and is therefore unsatisfactory. Furthermore, when the screens are thus adhesively secured, considerable difficulty is experienced in removing the screens to correct or adjust the felt pads, or other backing, which is positioned between the screen and the cassette, as is well known. During such removal, the screens, which are quite expensive, are often damaged, the disadvantages of which are obvious.

It is thus apparent that the present practice of adhesively securing the intensifying screen in position in the cassette is not entirely satisfactory. In order to overcome these difficulties, the present invention has as one of its objects the provision of a new and novel arrangement by which the screen may be secured in position in the cassette without the use of adhesives of any type.

Another object of the invention is the provision of screen mounting or securing means which permits ready and easy removal of the screen without damaging the latter, yet maintains the screen in intimate contact with the film during exposure.

Still another object of the invention is the provision of screen securing means which permits ready and easy adjustment or correction of the flexible backing pad without in no way, damaging the latter.

Yet another object of the invention is the provision of screen securing means which are simple and rugged in construction, inexpensive to manufacture, and extremely effective in use.

To these and other ends, the invention resides in certain improvements and combinations of parts all as will be hereinafter more fully described, the novel features being pointed out in the claims at the end of the specification.

In the drawing:

Fig. 1 is a perspective view of a cassette, with the back in open position, showing the preferred form of screen securing or mounting means;

Fig. 2 is a vertical sectional view through the cassette in closed position, showing the arrangement of the screw holding means illustrated in Fig. 1;

Fig. 3 is a vertical sectional view through the cassette illustrated in Fig. 2, showing a modified arrangement for detachably securing the intensifying screen to the cassette case;

Fig. 4 is a perspective view of a corner of the film and one of the screens illustrated in Fig. 3, showing the method of recessing or countersinking a corner of the back screen to position the head of screws of the screen securing members; and Fig. 5 is a view similar to Fig. 1, showing still another way of securing the screen in position in the cassette.

Similar reference numerals throughout the various views indicate the same parts.

The drawing shows an X-ray cassette formed to provide a case 11 made of any suitable substantially rigid material impervious to X-rays, such for example as metal. The case is provided with a back 12 hingedly secured to the case 11 along one edge 13 to afford access to the interior of the cassette to permit insertion and/or removal of a sensitized film 14. This film is usually double-coated with a sensitized emulsion and is positioned between a pair of intensifying screens 15 and 16 the film contacting faces or surfaces 17 of which are coated with a suitable fluorescent material, as is well known. Either or both screens 15 and 16 may be backed by a suitable flexible pad 18, such as felt, which is positioned between the screen and the case 11, as shown in Figs. 2 and 3. The front of the case 11 is provided with a radiolucent window 19 through which the X-rays may pass to expose the sensitized film 14.

In the preferred construction, as shown in Figs. 1 and 2, the back screen 15 is detachably or demountably secured to the hinged back 11. To this end, the corners 24 of the screen 15 are provided with openings 25 which register with similar openings 26 and 27 formed in the pad 18 and back 12 respectively, as shown in Fig. 2. Shanks 28 of bolts extend through these registering openings and have the outer ends 29 thereof threaded to receive nuts 30 by which the bolts may be drawn up into screen clamping or securing position as shown in Fig. 2. A locknut 31 is preferably positioned under each nut 30, as clearly shown in Fig. 2. The inner end of each bolt is upset to provide a head portion 32 arranged to overlie and engage the face 17 of the screen 15 adjacent the opening 25.

It is apparent that when the nuts 30 are drawn up, the heads 32 of the bolts will engage and secure the screen 15 to the back 11, as shown in Fig. 1. It is also apparent that the screen 15 may be removed or detached from the back 11 merely by backing off the nuts 30 from the shanks 28. As the screen 16 is on the bottom of the cassette when the latter is open, as shown in Fig. 1, it has not been found necessary to also detachably secure this screen to the cassette case. It is obvious, however, that the screen 16 may, if desired, be secured in the same manner as the screen 15.

The bolt heads 32 may be slotted at 33 so that the bolts may be tightened by turning the heads 32 and shanks 28. However, in order to prevent injury to the fluorescent surface 17, it is preferred to hold the heads 32 and shanks 28 stationary and merely turn the nuts 30 to tighten the screen clamping bolts, as will be appreciated by those in the art.

As the heads 32 of the bolts project above the surface 17 of the screen 15, it is apparent, upon inspection of Fig. 2, that these heads will engage the corners of the opposite screen 16 to hold the latter out of intimate contact with the film 14. In order that both surfaces 17 may properly contact the film, the corners 34 of the screen 16 are cut away to afford recesses 35 which are arranged in registry with the heads 32 and into which the heads may be positioned when the cassette is closed, as shown in Fig. 2. By means of such an arrangement, the film 14 is securely held in place between the screens 15 and 16, and the fluorescent surfaces 17 are in intimate contact with the emulsion coatings of the film. In addition, the corners 36 of the film 14 are forced into the recesses 35 by the heads 32 to securely clamp the film in position. When, however, the back 12 is open, as shown in Fig. 1, the bolt heads 32 are moved out of contact with the film 14 and the latter may be removed and replaced by an unexposed film, after which the cassette may be closed to make another exposure, as is apparent.

In the embodiment shown in Figs. 3 and 4, the corners 39 of the back screen 15 are skived or cut away through a portion of the screen thickness to provide shallow countersunk portions or recesses 40 in which the heads 32 of the bolts are positioned. As the heads 32 are quite thin, being about .020 inch in thickness, the countersunk portions 40 are quite shallow so that the heads 32 may be broadly considered as engaging the surface 17 of the back screen 15. The head 32 of each screen securing bolt rests on the bottom 41 of the portion 40, while the shank portion 42 extends through the registering openings 25 and 26 in the screen 15 and backing pad 18 respectively, and threadably engages an aligned opening 43 in the back 11, as clearly shown in Fig. 3. It is obvious, of course, that the bolt shanks 42 may extend beyond the back 12 to receive nuts 30, as in Fig. 1. With the arrangement shown in Figs. 3 and 4 it is not necessary to cut away the corners of the opposite or front screen 16 as is the case in the embodiment shown in Figs. 1 and 2. For this reason the front screen 16 contacts the film 14 over the entire area thereof.

The modification shown in Fig. 5 is similar to that illustrated in Figs. 1 and 2 and differs therefrom only in that the bolts for securing the screen 15 are L-shaped so that the shanks 28 thereof do not pass through the screen itself. Parts corresponding to those in Figs. 1 and 2 are designated by the same numerals. The inner ends of the bolts are formed with flat radial extending portions or heads 46 which rest on and engage the surface 17 adjacent the corners thereof to detachably secure the screen 15 to the back 12. The registering corners 34 of the screen 16 are cut away, as described in connection with Figs. 1 and 2. It is obvious, of course, that the corners of the screen 15 may be skived to provide countersunk portions, as in Figs. 3 and 4. In which case, the bolt heads 46 would be positioned in the countersunk portions, and it would not then be necessary to cut the corners of the screen 16.

It is apparent from the above description that the present invention provides an arrangement for detachably mounting an intensifying screen in an X-ray cassette without the use of adhesive, as in present practice. These screen securing members not only hold the screen in position, but permit ready and easy removal of the screen without in any way damaging the latter or the film backing pad. Such screen securing means effectively overcomes the difficulties inherent in the present method of adhesively securing the screen to the cassette.

While certain embodiments of the invention have been disclosed, it is to be understood that the inventive idea may be carried out in a number of other ways. This application is, therefore, not to be limited to the precise details described, but is intended to cover all variations and modifications thereof falling within the spirit of the invention or the scope of the appended claims.

I claim:

1. A cassette for holding a photographic film comprising a light tight case, an intensifying screen positioned within said case and having one face thereof formed with a fluorescent surface adapted to be positioned in intimate contact with said film, and screen retaining members in the form of bolts, each bolt having a shank portion detachably secured to said case and a head portion engaging said face to demountably secure said screen to said case.

2. A cassette for holding a photographic film comprising a light tight case, an intensifying screen positioned within said case and having one face thereof formed with a fluorescent surface adapted to be positioned in intimate contact with said film, means having intermediate portions extending through registering openings in said screen and case, and end portions on said means engaging said case and said face to detachably secure said screen to said case.

3. A cassette for holding a photographic film comprising a light tight case, a pair of intensifying screens positioned on opposite sides of said film, each screen having one face thereof formed with a fluorescent surface adapted to be arranged in intimate contact with one face of said film, and screen holding members positioned adjacent the corners of one of said screens, each of said members having a shank portion threadedly engaging said case and a head portion engaging said one face of said one screen adjacent a corner thereof to removably secure said one screen to said case, the other of said screens having the corner thereof cut away to afford recess arranged to receive the head portions of said members.

4. A cassette for holding a photographic film comprising a light tight case, a pair of intensifying screens positioned on opposite sides of said film, each screen having one face thereof formed with a fluorescent surface adapted to be arranged in intimate contact with one face of said film, screen holding members positioned adjacent the corners of one of said screens, each of said members having a shank portion arranged to extend through registering apertures in said one screen and said case and detachably secured to the latter, and a head portion on each of said shanks arranged to engage one face of said one screen to detachably secure the latter to said case, the corners of said other screen being cut away at points in registry with said head portions to provide recess into which said head portions are arranged to project when the cassette is closed.

5. A cassette for holding a photographic film comprising a light tight case, an intensifying screen positioned within said case and having one face thereof formed with a fluorescent surface adapted to be positioned in intimate contact with said film said screen having countersunk corner portions, members removably secured to said case, and portions on said members arranged to be positioned in said recess and engage said screen to demountably secure the latter to said case.

6. A cassette for holding a photographic film comprising a light tight case, an intensifying screen positioned within said case and having one face thereof formed with a fluorescent surface adapted to be positioned in intimate contact with said film, said surface being formed with countersunk corner portions, and screen securing member comprising bolts having shanks projecting through and detachably secured to said case and head portions engaging said corner portions to demountably secure said screen in position on said case.

HERBERT J. DIETZ.